Aug. 25, 1942.　　J. N. KIEP ET AL　　2,294,185
PLANETARY GEARING
Filed Oct. 8, 1940　　3 Sheets-Sheet 1

Patented Aug. 25, 1942

2,294,185

UNITED STATES PATENT OFFICE 2,294,185

PLANETARY GEARING

Johann Nikolaus Kiep, Hamburg, Germany, and Harold Sinclair, Kensington, London, England Application October 8, 1940, Serial No. 360,286
In Great Britain September 1, 1939

9 Claims. (Cl. 74—189.5)

This invention relates to planetary gearing and especially but not exclusively to marine reversing gearing suitable for use in association with internal-combustion engines.

An object of this invention is to provide a marine reversing gearing which is compact and light, and which is nevertheless durable and capable of being rapidly and easily controlled.

Another object is to provide marine reversing gearing which yields a convenient speed-reduction between the engine and the propeller shaft on both forward and reverse gears, while, under all conditions of operation, none of the elements of the gearing runs at such a high speed as to cause any difficulties.

A further object is to provide in planetary gearing an improved arrangement for taking up the axial thrusts generated in helical-toothed gear wheels.

Yet another object is to provide improved means for equalising the load between parallel operating clusters of planet wheels of a planetary gear.

The improved reversing system is particularly suitable for twin-screw vessels, since the rapid control possible facilitates manoeuvering by reversing and braking the screws independently of each other.

Figure 1:
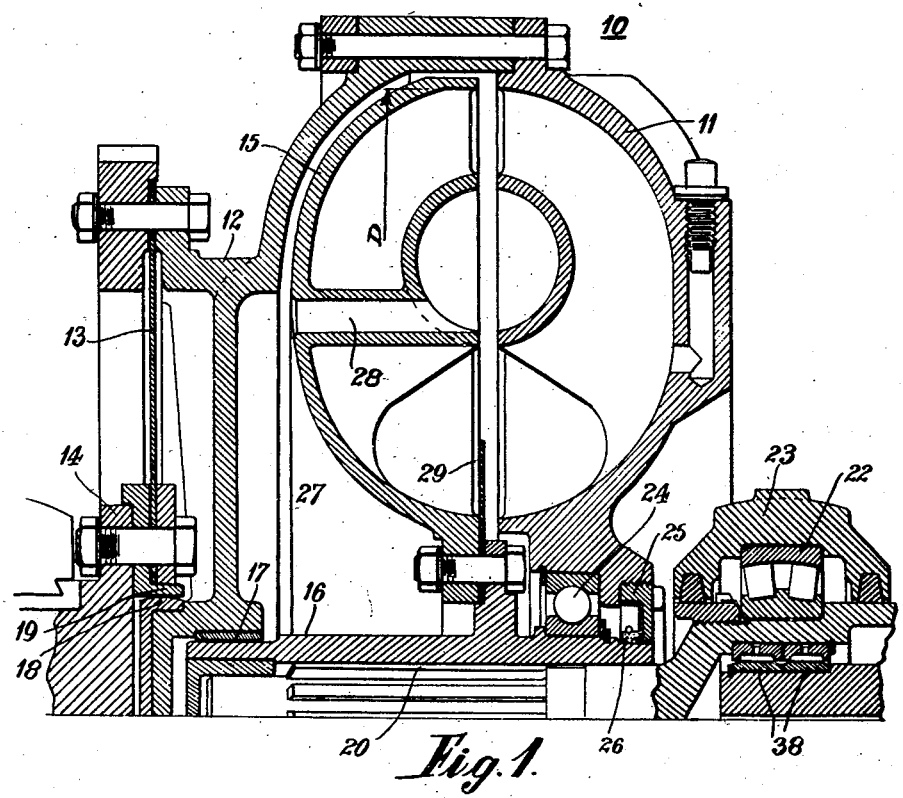
Figure 2:
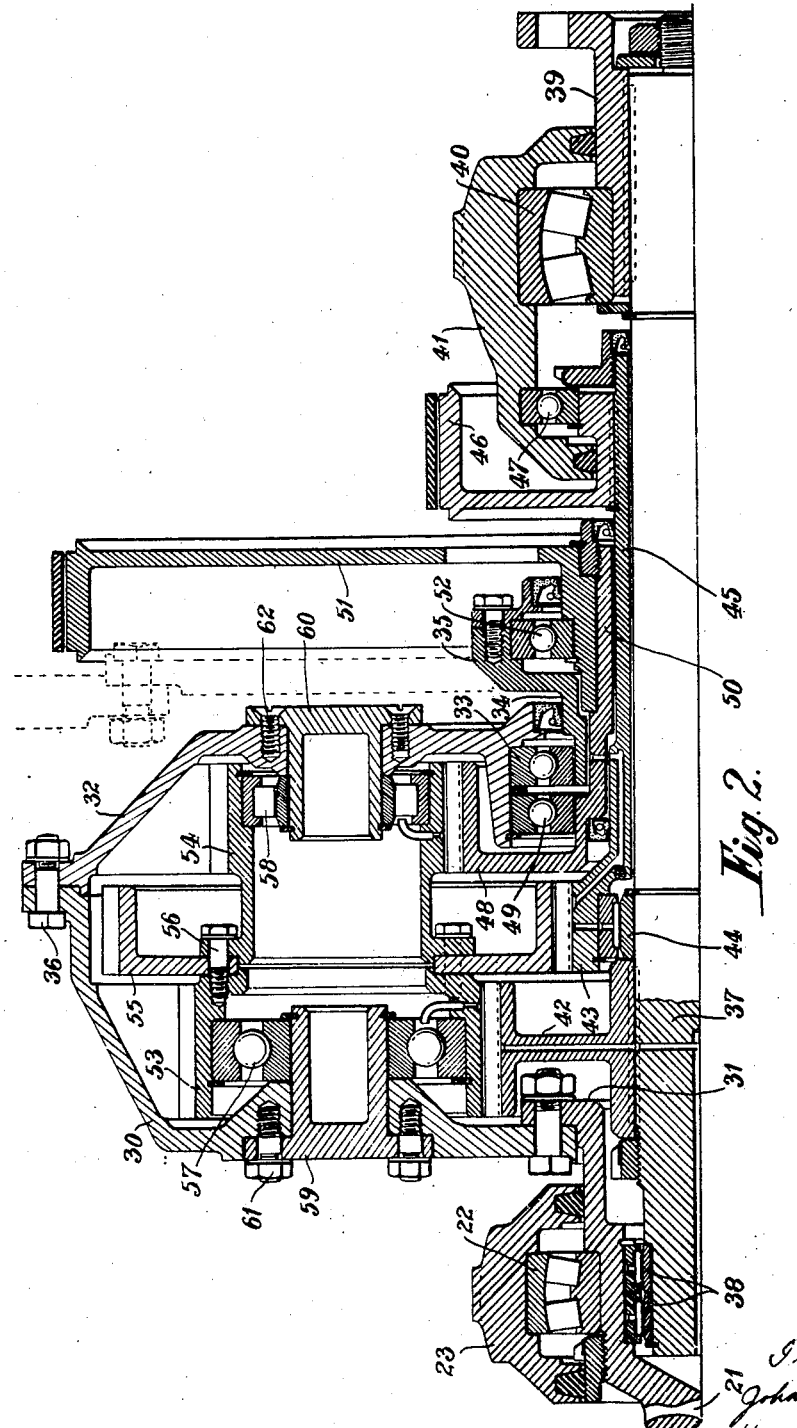
Figure 3:
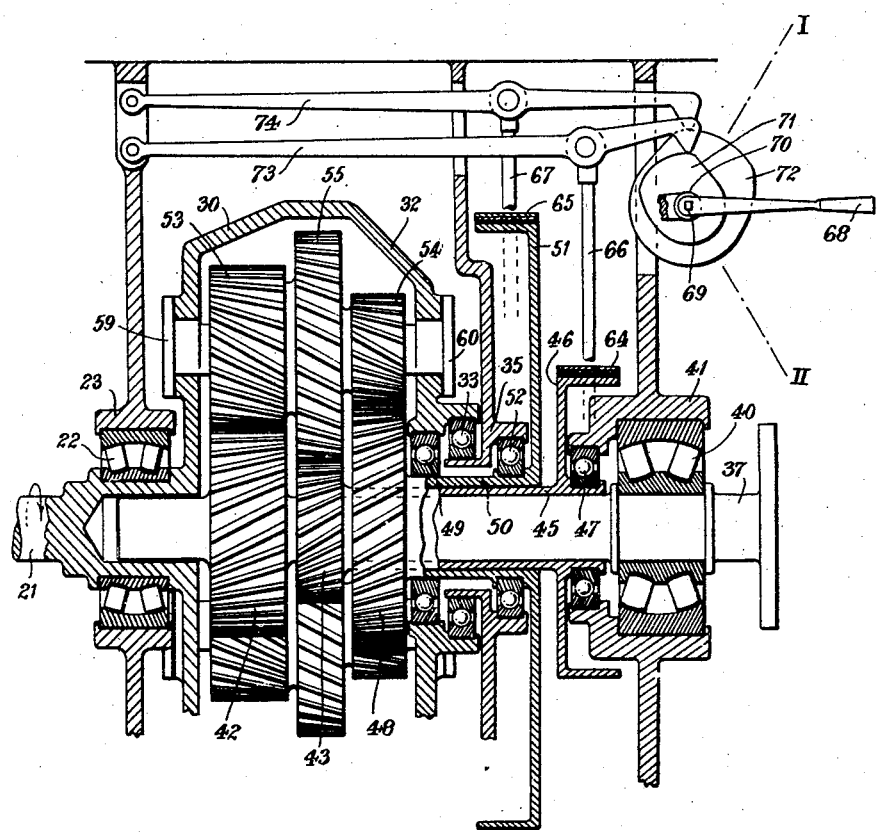

Further objects and advantages of this invention will be apparent from the following description of an embodiment thereof shown by way of example in the accompanying drawings, in which:

Fig. 1 is a sectional view of the upper half of the front part of the power transmission system, Fig. 2 is a similar view of the rear part, and Fig. 3 is a diagrammatic view of the gearing and control means.

As shown in Fig. 1, a hydraulic coupling 10 has an impeller 11 and a driving casing 12 connected by a flexible driving diaphragm 13 to the crank-shaft 14 of an internal combustion engine. The coupling runner 15 is fixed to a runner sleeve 16 which is journalled at 17 in the casing 12 which in turn is located by a part-spherical spigot 18 fitted in a socket 19 fixed to the crank-shaft. The sleeve 16 is connected by splines 20 to an intermediate shaft 21 which is journalled in a double-row roller bearing 22 accommodated in a fixed housing 23 and capable of absorbing both journal and thrust loads. A deep-groove ball bearing 24 supports the impeller 11 with respect to the sleeve 16 and shaft 21; and a gland 25, which may comprise a cup 26 of synthetic rubber, seals the hydraulic coupling. A reservoir chamber 27 may be formed between the driving casing 12 and the back of the runner 15 and communicating with the interior of the working circuit by ducts such as 28 formed in some of the runner vanes. The coupling preferably has a baffle ring 29.

The planetary gearing has a planet-carrier, which may also serve as a rotary casing, and which includes a front shell 30 fixed to a flange 31 on the rear end of the shaft 21, and a rear shell 32 journalled on a ball bearing 33 mounted on a sleeve 34 which is fixed to a stationary support 35, the shells 30 and 32 being secured together by bolts 36. The bearing 33 is a journal bearing arranged to take only journal loads. An output shaft 37 is supported at its front end in needle bearings 38 housed in a counterbore in the shaft 21 and within the bearing 22. To the rear end of the shaft 37 is fixed a propeller-shaft coupling member 39 which is journalled in the main thrust bearing 40 accommodated in a stationary housing 41. A sun wheel 42, having fifty-one left-handed helical teeth, is fixed to the shaft 37.

A sun wheel 43, having thirty-three left-handed helical teeth, is journalled by a needle bearing 44 on the shaft 37 and is integral with a sleeve 45 on which is fixed a forward-drive brake drum 46. A deep-groove ball-bearing 47 is arranged to transmit both journal and thrust loads from the hub of the drum 46 to the bearing housing 41.

A sun wheel 48, having sixty left-handed helical teeth, is journalled by a ball bearing 49 in the hub of the shell 32 and is integral with a sleeve 50 on which is fixed a reverse-drive brake drum 51. The bearing 49 is required to take only journal loads. A deep-groove ball-bearing 52 is arranged to transmit both journal and thrust loads from the hub of the drum 51 to the stationary support 35.

The planet carrier preferably encloses three similar uniformly spaced planet sets, each of which is arranged as follows. A hollow gear wheel 53 having thirty-eight teeth meshes with the sun wheel 42. A hollow gear wheel 54 having twenty-nine teeth meshes with the sun wheel 48. An angle-section gear wheel 55 having fifty-six teeth meshes with the sun wheel 43 and is rigidly clamped between the wheels 53 and 54 by screws 56. This planet set, which forms a stiff hollow shaft, is journalled on a deep-groove ball bearing 57 adapted to take both journal and thrust loads and a roller bearing 58 mounted respectively on flanged pins 59 and 60 accurately spigoted into holes in the shells 30 and 32, the flanges being secured to the shells by several uniformly spaced studs and nuts 61 or screws 62. The portions of the pins 59 and 60 on which the bearings 57 and 58 are fitted are very slightly eccentric with respect to the portions fitted in the holes in the shells 30 and 32, as is shown exaggerated in Fig. 3. Provided the three planet pinions in each set are fitted together in exact angular relationship, the load can be equally distributed between the several sets of planets, in spite of slight inaccuracies in the location of the pins 59 and 60 in the planet carrier shells, by adjusting one or other of these pins until all the pinions take up their loads evenly. The variation in the distance from centre to centre of the meshing pairs of wheels, due to this method of adjustment, is so slight as to be immaterial.

The control mechanism, shown diagrammatically in Fig. 3, includes brake bands 64 and 65 co-operating respectively with the drums 46 and 51 and adapted to be engaged with these drums by the tensioning of pull rods 66 and 67 respectively in well known manner. A control lever 68 is fixed to a shaft 69 journalled in fixed bearings such as 70. Cams 71 and 72 are fixed to the shaft 69 and co-operate respectively with follower levers 73 and 74 to which are pivotally connected the pull rods 66 and 67. The lever 68 is shown in the braking position in which both brakes are applied. If it is moved to position I, the brake drum 46 is released while the drum 51 remains braked, while, if it is moved to position II, the brake drum 51 is released while the drum 46 is locked. If the lever 68 is moved 180 deg. from the position shown, both brakes are released, so that the engine can idle unloaded.

The helix angle of all the gear wheels may be 30 degrees.

The arrangement shown in Figures 1 and 2, which is drawn to scale, when embodying a hydraulic couping in which the outer profile diameter D is 540 millimetres, is suitable for use with an engine having a maximum continuous rating of 120 H. P. at 1,400 R. P. M. When the lever is in position II, so that the drum 51 is free and the drum 46 is arrested by its brake 64, if then the planet carrier is driven at say 1,400 R. P. M. in a clockwise direction as viewed from the engine, the planets 55 are caused to roll round the now stationary small sun 43 and the planets 53 consequently drive the sun 42 and with it the output shaft 37 forwards at 785 R. P. M. Under these conditions the thrust generated in the helical-toothed sun 43 is taken directly to the housing 41 by the bearing 47 which is at rest; the thrust generated in the output helical-toothed sun wheel 42 is opposed by the propeller thrust, so that the main thrust bearing 40 is required to take up only the difference of these thrusts; and the thrusts generated in the loaded planet wheels 53 and 55 are also opposed to each other, so that only the difference of these thrusts has to be transmitted through the thrust bearings 57, on which the planet clusters are journalled, to the bearing 22.

When the lever 68 is in position I, the drum 46 is free and the drum 51 is arrested by its brake 65. If now the planet carrier is driven at 1,400 R. P. M., the planets 54 are caused to roll round the now stationary large sun 48 and the planets 53 consequently drive the sun 42 and the output shaft 37 backwards at 760 R. P. M. Under these conditions the thrust generated in the sun wheel 48 is taken directly to the stationary support 35 by the bearing 52, which is at rest; the thrust generated in the output sun wheel 42 is again opposed by the propeller thrust, so that the main thrust bearing 40 is required to take up only the difference of these thrusts; and the thrusts generated in the loaded planet wheels 53 and 54 are also opposed to each other, so that only the difference of these thrusts has to be transmitted to the bearing 22.

If while the vessel is running ahead or astern the engine is retarded and the lever 68 is moved to the position in which it appears in Fig. 3, so that both the drums 46 and 51 are simultaneously braked, the propeller shaft is thereby prevented from rotating while the hydraulic coupling permits the engine to continue running.

We claim:

1. Marine speed-reducing and reversing gearing including in combination a hydraulic slippable coupling of the kinetic type having cooperating vaned driving and driven elements, an output shaft for drivable connection to the ship propeller, a planetary toothed gear having a planet carrier connected to said driven element, a small sun wheel and a large sun wheel connected respectively to two rotatable elements, a sun wheel of intermediate size connected to said output shaft, at least one set of three co-axial planet wheels journalled in said planet carrier, connected together for rotation as a unit and meshing respectively with said three sun wheels, friction stops associated with said rotatable elements, and a common control member operatively connected to said stops, capable when in one position of maintaining said stops simultaneously applied so as to arrest rotation of said output shaft and its propeller while said vaned driving element is permitted to rotate by slip in said hydraulic coupling, said control member being movable in two senses from said position to release respectively the one and the other of said stops and thereby to put the gearing in condition for rotation of said output shaft forwards and backwards respectively.

2. Planetary toothed gearing including a rotatable planet carrier, a shaft co-axial with said carrier, a sun wheel on said shaft, two sleeves co-axial with said shaft, brakes associated with said sleeves, two single-helical-toothed sun wheels fixed to said sleeves respectively, three co-axial planet wheels journalled in said planet carrier, connected together for rotation as a unit and meshing respectively with said sun wheels, and two bearings capable of transmitting axial thrusts and interposed between said sleeves respectively and fixed supporting means.

3. In a marine propelling plant, a propeller, a planetary reversing gear including an output shaft connected to said propeller for receiving the thrust therefrom, a main thrust bearing associated with said shaft, a single-helical-toothed output sun wheel fixed to said shaft, reverse and forward drive single-helical-toothed sun wheels having respective diameters exceeding and less than that of said output sun wheel, brakes associated with said reverse and forward wheels and engageable alternatively to establish reverse and forward drives, a driving planet carrier, and three co-axial planet wheels journalled in said carrier, connected together for rotation as a unit and meshing respectively with said sun wheels, the helix directions of the teeth of said wheels being such that on both forward and reverse drives the thrust on said output shaft due to said propeller is opposed by the thrust due to the teeth of said output sun wheel and the thrusts originating in the loaded two of said three planet wheels also oppose each other.

4. In a marine propelling plant, a propeller, a planetary reversing gear including an output shaft connected to said propeller for receiving the thrust therefrom, a main thrust bearing associated with said shaft, a single-helical-toothed output sun wheel fixed to said shaft, two sleeves co-axial with said shaft, reverse and forward drive single-helical-toothed sun wheels fixed to said sleeves respectively and having respective diameters exceeding and less than that of said output sun wheel, brakes associated with said sleeves, a driving planet carrier, at least one cluster of three co-axial planet wheels journalled in said carrier, connected together for rotation as a unit and meshing respectively with said sun wheels, and three bearings capable of transmitting axial thrusts and interposed between fixed supporting means and respectively said sleeves and said carrier, the helix directions of the teeth of said wheels being such that on both forward and reverse drives said main thrust bearing is required to absorb only the difference between the propeller thrust and the thrust originating in said output sun wheel, and that the one of said thrust bearings between said carrier and said fixed supporting means is required to absorb only the difference in the thrusts originating in the loaded two of said three planet wheels.

5. A planetary gear having a planet carrier and a shaft co-axial therewith, said gear serving to give a choice of forward and reverse drives between said carrier and said shaft and including a first sun wheel fixed to said shaft, a first sleeve penetrated by said shaft, a second sun wheel fixed to said sleeve, a second sleeve penetrated by said first sleeve, a third sun wheel fixed to said second sleeve, brakes associated with said sleeves, at least three co-operating planet wheels journalled in said carrier and meshing respectively with said three sun wheels, all of said wheels having single-helical teeth, fixed supporting means, and four thrust bearings interposed between on the one hand said supporting means and on the other hand respectively said shaft, said first sleeve, said second sleeve and said carrier.

6. A planetary gear of the kind including two toothed sun wheels disposed co-axially with a planet carrier and at least two clusters of toothed planet wheels, each of said clusters including two wheels connected together for rotation as a unit, rotatably mounted on said planet carrier and meshing respectively with said sun wheels, characterised in that at least one of said clusters is mounted on bearing means capable of being adjusted, independently at each end of the cluster, eccentrically with respect to the axis of the cluster, to an extent sufficient to permit torque loads on both of said sun wheels to be equally distributed between the planet wheels meshing with each.

7. A planetary gear of the kind including a plurality of toothed sun wheels disposed co-axially with a planet carrier and at least two clusters of toothed planet wheels, each of said clusters consisting of a plurality of wheels connected together for rotation as a unit, rotatably mounted on said planet carrier and meshing respectively with said sun wheels, characterised in that at least one of said clusters is journalled at each of its ends on a support, and that each of said supports is capable of angular displacement in said carrier, independently of the other of said supports, about an axis slightly eccentric to the axis of the cluster journalled thereon.

8. A planetary gear including a first shaft, a planet carrier fixed to an end of said shaft, a first bearing supporting said shaft from a first fixed member, a second shaft aligned with said first shaft and penetrating said planet carrier, a pilot bearing supporting an end of said second shaft through said first bearing, a bearing supporting said planet carrier from a second fixed member at the end of said carrier remote from said first shaft, a bearing supporting said second shaft from a third fixed member, a first sun wheel rigid with said second shaft, a second sun wheel rigid with an inner sleeve surrounding said second shaft, a bearing supporting said sleeve from said third fixed member, a third sun wheel rigid with an outer sleeve surrounding said inner sleeve, a bearing supporting said outer sleeve from said second fixed member, co-operating planet pinions journalled in said planet carrier and meshing respectively with said three sun wheels, two brake drums constrained to rotate with said sleeves respectively and disposed between said second and third fixed members, and means for selectively controlling the rotation of said drums.

9. A planetary gear including three co-axial sun wheels, a planet carrier embracing said wheels, co-operating planet wheels journalled in said planet carrier and meshing respectively with said sun wheels, all of said wheels having single-helical teeth, a first shaft fixed at one end thereof to said planet carrier, thrust and journal bearing means supporting said shaft from a first fixed member, a second shaft aligned with said first shaft, rigid with one of said sun wheels and penetrating said planet carrier, a pilot bearing supporting an end of said second shaft through said bearing means, a journal bearing supporting said planet carrier from a second fixed member at the end of said carrier remote from said first shaft, thrust and journal bearing means supporting said second shaft from a third fixed member, an inner sleeve surrounding said second shaft and rigid with another of said sun wheels, thrust and journal bearing means supporting said sleeve from said third fixed member, an outer sleeve surrounding said inner sleeve and rigid with the third of said sun wheels, thrust and journal bearing means supporting said outer sleeve from said second fixed member, two brake drums constrained to rotate with said sleeves respectively and disposed between said second and third fixed members, and means for selectively controlling the rotation of said drums.

JOHANN NIKOLAUS KIEP.
HAROLD SINCLAIR.